US010894505B2

(12) United States Patent
    Sabharwal et al.

(10) Patent No.: US 10,894,505 B2
(45) Date of Patent: Jan. 19, 2021

(54) LIGHTING CONTROL FOR A COMPUTER ASSISTED VEHICLE

(71) Applicant: Intel Corporation, Santa Clara, CA (US)

(72) Inventors: Manuj R. Sabharwal, Folsom, CA (US); Chao Huang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/473,611

(22) PCT Filed: Mar. 31, 2017

(86) PCT No.: PCT/CN2017/078947
§ 371 (c)(1),
(2) Date: Jun. 25, 2019

(87) PCT Pub. No.: WO2018/176362
PCT Pub. Date: Oct. 4, 2018

(65) Prior Publication Data
US 2020/0148095 A1    May 14, 2020

(51) Int. Cl.
*B60Q 1/14*       (2006.01)
*B60W 50/00*      (2006.01)
*G06K 9/00*       (2006.01)

(52) U.S. Cl.
CPC ......... *B60Q 1/143* (2013.01); *B60W 50/0098* (2013.01); *G06K 9/00798* (2013.01); *B60Q 2300/054* (2013.01)

(58) Field of Classification Search
CPC ............. B60Q 1/143; B60Q 2300/054; B60W 50/0098; G06K 9/00798
See application file for complete search history.

(56) References Cited

U.S. PATENT DOCUMENTS 5,537,003 A * 7/1996 Bechtel .................. H05B 47/11
                                              315/82
2003/0137849 A1 * 7/2003 Alden ....................... B60Q 1/12
                                              362/466
(Continued)

FOREIGN PATENT DOCUMENTS

CN    1692470 A    11/2005
CN    1785715 A    6/2006
(Continued)

OTHER PUBLICATIONS

International Search Report and Written Opinion dated Dec. 28, 2017 for International Patent Application No. PCT/CN2017/078947, 12 pages.

*Primary Examiner* — Donald L Raleigh
(74) *Attorney, Agent, or Firm* — Schwabe, Williamson & Wyatt, P.C.

(57) ABSTRACT

Embodiments include apparatuses, methods, and systems including a computer assisted system of lighting control for a computer assisted vehicle that may adjust a lighting device of the vehicle to emit lights with different characteristics in real time depending on the environment and the surroundings of the vehicle. A computer assisted system of lighting control for a computer assisted vehicle may adjust a lighting device on the vehicle based on a driver's preference about the light for driving, a light received by a sensor on the vehicle from a non-natural light source external to the vehicle, or an instruction received by a receiver on the vehicle from a sender external to the vehicle. The computer assisted system of lighting control for a computer assisted vehicle may also transmit an information or instruction to adjust a non-natural light source external to the vehicle.

22 Claims, 8 Drawing Sheets

(56) References Cited

U.S. PATENT DOCUMENTS

| | | | | |
|---|---|---|---|---|
| 2005/0141232 A1* | 6/2005 | Chon | ............... | B60Q 1/1415 |
| | | | | 362/509 |
| 2012/0026726 A1* | 2/2012 | Recker | ............... | H05B 45/10 |
| | | | | 362/157 |
| 2014/0218526 A1* | 8/2014 | Feid | ............... | B60Q 9/00 |
| | | | | 348/148 |
| 2017/0144588 A1* | 5/2017 | Dziurda | ............ | G06K 9/00805 |

FOREIGN PATENT DOCUMENTS

| | | |
|---|---|---|
| CN | 105751958 A | 7/2016 |
| CN | 106043104 A | 10/2016 |
| CN | 106274647 A | 1/2017 |
| JP | S6261852 A | 3/1987 |

* cited by examiner

LIGHTING CONTROL FOR A COMPUTER ASSISTED VEHICLE

CROSS REFERENCE TO RELATED APPLICATIONS

The present application is a national phase entry under 35 U.S.C. § 371 of International Application No. PCT/CN2017/078947, filed Mar. 31, 2017, entitled "LIGHTING CONTROL FOR A COMPUTER ASSISTED VEHICLE", which designated, among the various States, the United States of America. The Specifications of the PCT/CN2017/078947Application is hereby incorporated by reference.

FIELD

Embodiments of the present disclosure relate generally to the technical field of computer assisted or autonomous driving vehicles, and more particularly to lighting control for a computer assisted vehicle.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A vehicle, such as a car, truck, or cart, may move or transport people or goods, especially on land, from one location to another. A car or a vehicle may be used interchangeably herein. A vehicle often has various kinds of lighting devices to emit light to assist the driving. However, light emitted from a lighting device of one vehicle may create a glare or danger to a driver of another vehicle. For example, a high intensity light from a high intensity discharge (HID) lamp on one vehicle may generate a glare to a driver through a side mirror of a vehicle in an opposite direction, which may make the driver to have impaired vision. According to National Highway Traffic Safety Administrator (NHTSA) statistics, 17% of crashes with environmental causes have been caused by vehicle light glare. The danger caused by glare of vehicle light may be worsened with advancement in vehicular technologies. For example, there may be a significant increase in intensity of light emitted by a lighting device of a vehicle. Additional lighting devices, such as extra light-emitting diode (LED) lighting devices, may be more widely used in vehicles with increased glare. A higher vehicle, e.g. a sport utility vehicle (SUV), driving behind a sedan may emit light at a same height as an eye level of a driver for the sedan, causing direct glare to the driver. Moreover, with the increase of the number of vehicles on the road, in a heavy traffic zone, there may be more vehicles that may emit lights to create more impact on each other vehicle.

Currently, a vehicle may adjust its lighting devices to emit light with different characteristics according to a day/night time. However, a vehicle does not adjust or adapt lighting devices on the vehicle to emit lights with different characteristics according to the environment the vehicle is in, where the environment may include more factors than just a day/night time. For example, the lighting devices of a vehicle may emit light with a same characteristic, e.g., a light intensity, during an entire trip at night, regardless of other vehicles or street lights around the vehicle along the way.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
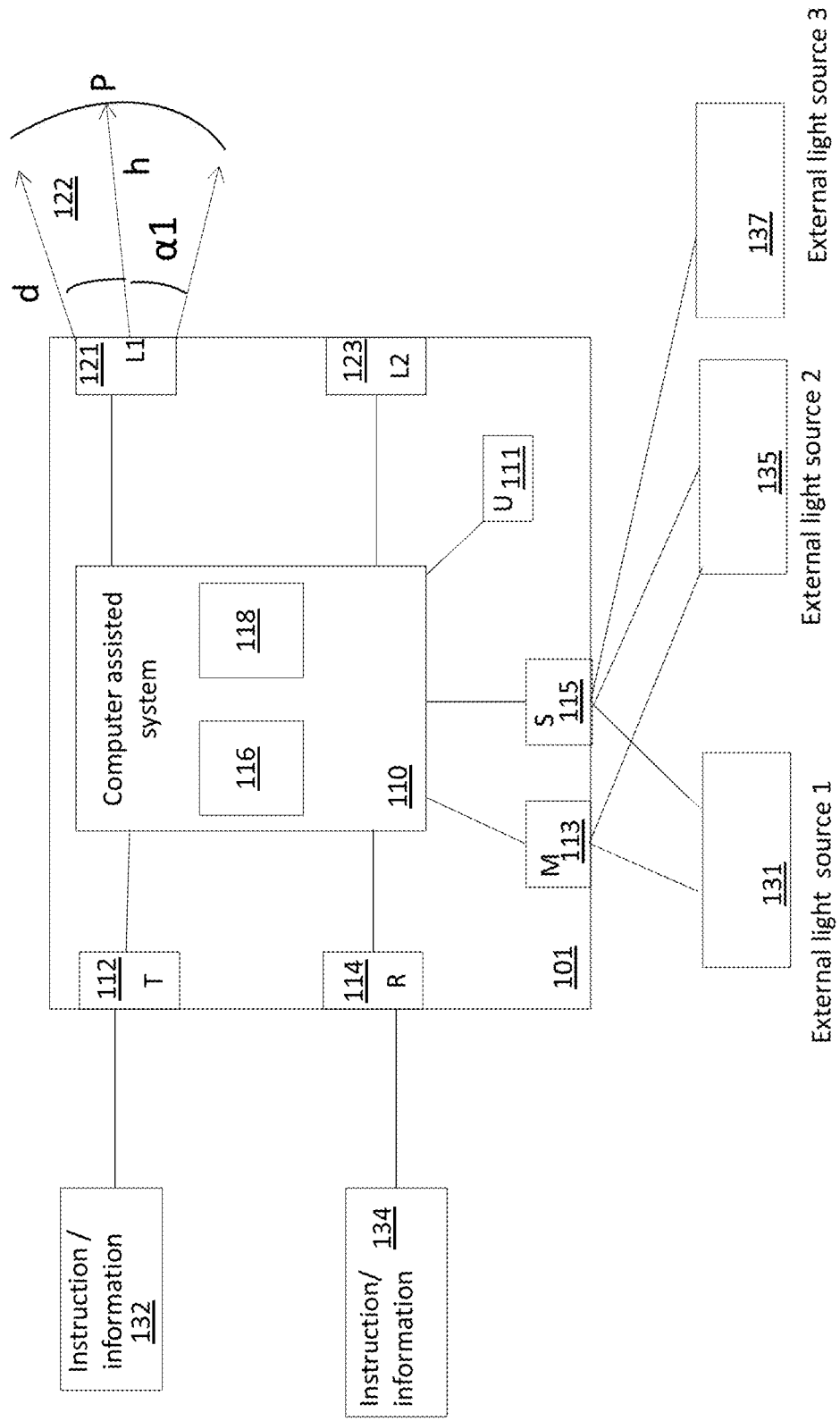
FIG. 1 illustrates an example computer assisted system of lighting control for a computer assisted vehicle that may adjust a lighting device of the vehicle to emit lights with different characteristics, in accordance with various embodiments.

The glare of vehicle light may cause danger and safety concerns to drivers. A computer assisted system of lighting control for a computer assisted vehicle may adjust a lighting device of the vehicle to emit lights with different characteristics in real time depending on the environment and the surroundings of the vehicle, where the environment may include more factors than just a day/night time. A computer assisted system of lighting control for a computer assisted vehicle may consider a driver's preference about the light for driving, in addition to the impact to other drivers, and lights received from external non-natural light sources, e.g., artificial light sources. The computer assisted system of lighting control for a computer assisted vehicle may be facilitated by communications between vehicles and smart devices, e.g. smart street lights, within the proximity of the vehicle. Using sensors and transmitters/receivers, a computer assisted system of lighting control for a computer assisted vehicle may consider the impact of other vehicles and ambient lights from non-natural light sources along the street in the proximity and connected or communicating to the vehicle. A computer assisted system of lighting control for a computer assisted vehicle may reduce the glare and blindness to others drivers while creating a similar lighting condition along the way for the driver of the computer assisted vehicle. In addition, the cost of using light sensors in implementing a computer assisted system of lighting control for a computer assisted vehicle may be nominal. For example, a vehicle may have smart cameras installed for other monitor purposes, while smart cameras may be enhanced to read an intensity or a luminosity of lights received from other vehicles and provide inputs for the computer assisted system of lighting control. Embodiments herein with a computer assisted system of lighting control for a computer assisted vehicle may also enhance the adaptive dimming mirror technology. A computer assisted vehicle and an autonomous driving vehicle may be used interchangeably herein, and may include vehicles with or without a driver.

In embodiments, a computer assisted vehicle may include a lighting device on the vehicle, a sensor on the vehicle to receive a light from a non-natural light source external to the vehicle, and a computer assisted or autonomous driving system on the vehicle, coupled to the lighting device and the sensor. The lighting device on the vehicle may emit a light with a first characteristic. The computer assisted or autonomous driving system may obtain a second characteristic of the non-natural light received by the sensor from the non-natural light source external to the vehicle. Based on the second characteristic of the light received, the computer assisted or autonomous driving system may adjust the lighting device on the vehicle to emit a light with a third characteristic different from the first characteristic. A computer assisted system and an autonomous driving system may be used interchangeably herein.

In embodiments, a computer assisted vehicle may include a lighting device on the vehicle, a receiver on the vehicle coupled to the lighting device to receive an instruction from a sender external to the vehicle to adjust the lighting device on the vehicle, and a computer assisted system on the vehicle coupled to the lighting device and the receiver. The lighting device on the vehicle may emit a light with a first characteristic. Based on the instruction received by the receiver, the computer assisted system may adjust the lighting device on the vehicle to emit a light with a second characteristic different from the first characteristic.

In embodiments, one or more non-transitory computer-readable media may include instructions that may be executed by a computer assisted system in a vehicle. In response to execution of the instructions, the computer assisted system may determine a first characteristic of a light emitted by a lighting device on the vehicle coupled to the computer assisted system. The computer assisted system may also obtain a second characteristic of a light received by a sensor on the vehicle from a non-natural light source external to the vehicle. Based on the second characteristic of the light received, the computer assisted system may further adjust the lighting device on the vehicle to emit a light with a third characteristic different from the first characteristic.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, programmable combinational logic circuit (such as a field programmable gate array (FPGA)), a processor (shared, dedicated, or group) and/or memory (shared, dedicated, or group) that execute one or more software or firmware programs, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a programmable combinational logic circuit (such as a FPGA), and/or other suitable hardware components that provide the described functionality. As used herein, "computer-implemented method" may refer to any method executed by one or more processors, a computer system having one or more processors, a mobile device such as a wearable device, a smartphone (which may include one or more processors), a tablet, a laptop computer, a set-top box, a gaming console, and so forth.

FIG. 1 illustrates an example computer assisted system 110 of lighting control for a computer assisted vehicle 101 that may adjust a lighting device, e.g., a lighting device 121 or a lighting device 123, of the vehicle to emit lights with different characteristics, in accordance with various embodiments.

In embodiments, the computer assisted vehicle 101 may include the computer assisted system 110. In addition, the computer assisted vehicle 101 may include the lighting device 121, the lighting device 123, a transmitter 112, a receiver 114, a sensor 115, and a mirror 113, which may be coupled to the computer assisted system 110. The transmitter 112 may transmit an instruction or information 132, while the receiver 114 may receive an instruction or information 134. Furthermore, the mirror 113 may receive a light from a non-natural light source 131 and a light from a non-natural light source 135, both external to the computer assisted vehicle 101. Similarly, the sensor 115 may receive a light from the non-natural light source 131, a light from the non-natural light source 135, and a light from a non-natural light source 137, all external to the computer assisted vehicle 101. Examples of the non-natural light source 131, the non-natural light source 135, or the non-natural light source 137 may include, but are not limited, lights from on-coming or nearby vehicles, street lights, lights from nearby buildings/structures, and so forth. Furthermore, there may or may not be a user or a driver 111 who may operate the computer assisted vehicle 101.

In embodiments, the lighting device 121, the lighting device 123, the transmitter 112, the receiver 114, the sensor 115, and the mirror 113 may be located in various positions inside or outside the car, at the back or the front of the car, on the dashboard, the body, the side, or within the interior, or the trunk. In embodiments, the lighting device 121, the lighting device 123, the transmitter 112, the receiver 114, the sensor 115, and the mirror 113 may be coupled to computer assisted system 110 via one or more wired and/or wireless interconnects or buses. Examples of interconnects or buses may include, but are not limited, near field communication (NFC), universal serial bus (USB), I2C, and so forth.

In embodiments, the transmitter 112 may be a wireless transmitter that transmits the instruction or information 132 to other vehicles, other non-natural light sources, or a cloud computing environment. The instruction or information 132 being transmitted by the transmitter 112 may be an instruction or information generated by the mirror 113, the sensor 115, or the computer assisted system 110. In addition, the instruction or information 132 being transmitted by the transmitter 112 may be an instruction or information to control other vehicles or other non-natural light sources.

In embodiments, the receiver 114 may receive the instruction or information 134 from a sender external to the computer assisted vehicle 101. The instruction or information 134 received by the receiver 114 may be used by the computer assisted system 110 to adjust a lighting device on the vehicle, e.g., the lighting device 121, or the lighting device 123. In embodiments, the instruction or information 134 received by the receiver 114 may be used to adjust one specific lighting device, but not other lighting devices. For example, the instruction or information 134 received by the receiver 114 may be used to adjust the lighting device 121 but not the lighting device 123. In some other embodiments, the instruction or information 134 received by the receiver 114 may be used to adjust the lighting device 121 and the lighting device 123 at the same time in a same way. Further in some other embodiments, the instruction or information 134 received by the receiver 114 may be used to adjust the lighting device 121 and the lighting device 123 at different times or in different ways. The information or the instruction 134 may be received from another vehicle, other non-natural light sources, or from a cloud computing environment.

In embodiments, the transmitter 112 and the receiver 114 may be a transmitter or a receiver for various wireless technology for data transmission between vehicles (V2V), vehicle-to-infrastructure (V2I), or V2X (vehicle-to-everything). For example, the transmitter 112 and the receiver 114 may be a transmitter or a receiver for NFC, WiFi, or Long-Term Evolution (LTE) 4G/5G Automotive Alliance (SGAA) technology.

In embodiments, the lighting device 121 or the lighting device 123 may be a headlamp, an auxiliary lamp, a front fog lamp, a cornering lamp, a spot light lamp, a daytime running lamp, a dim-dip lamp, a side marker light lamp, an emergency lamp, a HID lamp, a reversing lamp, an identification lamp, or other vehicle lamps. In embodiments, the lighting device 121 may emit a light 122 with a first characteristic that may include a light intensity (also referred to as a luminous intensity), a light wavelength, a light power, a light distribution, a light angle, a light distance, or a light area. For example, the light 122 may have a distance d, an angle $\alpha$, an intensity h, and may cover an area $A=d*\alpha$. In embodiments, a light intensity or a luminous intensity of a light may be a measure of the wavelength-weighted power emitted by a light source in a particular direction per unit solid angle, based on the luminosity function, a standardized model of the sensitivity of the human eye. In addition, a light intensity may vary along the distance d. For example, a light intensity at a point P may be calculated using inverse square law with respect to the distance d, and the light intensity at the lighting device 121 where the light emits. A light intensity of a light may drop due to dark surroundings, since a light energy may depend on both the brightness and wavelength of the light, where the brightness may be a "subjective" quality of light depending on the viewer and the surroundings. In embodiments, the surrounding of the computer assisted vehicle 101 may include the light from the sun, the moon, or other causes not controlled by the computer assisted vehicle 101. In some embodiments, a visible light may usually have a wavelength in a range of 400-900 nanometers (nm). In embodiments, the lighting device 121 may change the characteristic of the light 122 emitted. For example, the light 122 with a first characteristic may last a duration of $T_1$, and then the lighting device 121 may change the characteristic of the light 122 to a different one.

In embodiments, the mirror 113 or the sensor 115 may receive a light from a non-natural light source external to the computer assisted vehicle 101. In embodiments, the mirror 113 or the sensor 115 may be able to distinguish natural light from a light emitted from a non-natural light source. For example, a natural light may have higher intensity (luminosity), and may not vary its intensity from one moment to the next while the computer assisted vehicle 101 is moving from one location to the next. On the other hand, the intensity of a non-natural light may change according to a distance between the computer assisted vehicle 101 and the non-natural light source. If the mirror 113 or the sensor 115 may detect a change in wavelength frequently for a light from a light source, then the light may be from a non-natural light source.

In embodiments, the mirror 113 may receive a light from the non-natural light source 131 and the light from a non-natural light source 135. Similarly, the sensor 115 may receive a light from the non-natural light source 131, a light from the non-natural light source 135, and a light from the non-natural light source 137. The non-natural light source 131, the non-natural light source 135, or the non-natural light source 137 may be a lighting device on a moving vehicle, or a stationary lighting device, which may be shown in FIG. 4 or FIG. 5. In embodiments, the sensor 115 and the mirror 113 may be separated devices. In some other embodiments, the sensor 115 and the mirror 113 may be merged into one device and function as both a mirror and a sensor. Still in some other embodiments, the sensor 115, or the mirror 113 may be merged with other devices, such as a smart camera installed for other monitor purposes, while the smart camera may be enhanced to read an intensity or a luminosity of lights. The sensor 115 may be photoresistor sensor, a photodiode sensor, or a phototransistor sensor, which may detect a light characteristic, e.g., how bright/dark a light may be, or detect how bright/dark the surrounding of the computer assisted vehicle 101 may be.

In embodiments, the mirror 113 or the sensor 115 may receive lights from multiple external non-natural light sources. For example, the sensor 115 may receive lights from the non-natural light source 131, the non-natural light source 135, and the non-natural light source 137. The mirror 113 or the sensor 115 may detect each individual wavelength of the light received. For example, the mirror 113 or the sensor 115 may detect a wavelength $\ell_1$ for a light from the non-natural light source 131, a wavelength $\ell_2$ for a light from the non-natural light source 135, and a wavelength $\ell_3$ for a light from the non-natural light source 137. Afterwards, the mirror 113 or the sensor 115 may derive an overall wavelength $\ell$, which may be equivalent to a sum of the wavelength $\ell_1$, the wavelength $\ell_2$, and the wavelength $\ell_3$. In addition, the mirror 113, the sensor 115, or other sensors, not shown, may detect other characteristics of the lights. For example, the mirror 113, the sensor 115, or other sensors may also detect an angle of a lights, the distances of the light sources. Those characteristics of the lights, e.g., the angles of the lights, the distances of the light sources may be used by the computer assisted system 110 to identify the light sources that emit lights with certain wavelengths.

In embodiments, the computer assisted system 110 may include an analyzer 116 and a controller 118. The computer assisted system 110 may be coupled to the mirror 113, the sensor 115, the receiver 114, or the transmitter 112, and receive information from them. For example, the computer assisted system 110 may receive a characteristic of the light from the sensor 115, or obtain the instruction or information 134 received by the receiver 114. The analyzer 116 may further analyze the characteristic of the light from the sensor 115, or the instruction or information 134. For example, the mirror 113 or the sensor 115 may detect the wavelength $\ell_1$ for a light from the non-natural light source 131, the wavelength $\ell_2$ for a light from the non-natural light source 135, and the wavelength $\ell_3$ for a light from the non-natural light source 137. The wavelength $\ell_1$ for the wavelength $\ell_2$, the wavelength $\ell_3$ may be sent to the analyzer 116, which may derive an overall wavelength $\ell$ as a sum of the wavelength $\ell_1$, the wavelength $\ell_2$, and the wavelength $\ell_3$. The analyzer 116 may also receive other data about the light source, e.g., the location of a vehicle having the light source.

The analyzer 116 may further associate a light with a light source by analyzing the data about the characteristic of the light and the data about the light source.

Furthermore, the controller 118 of the computer assisted system 110 may adaptively control the lighting device 121, the lighting device 123, or other lighting devices on the computer assisted vehicle 101. For example, the controller 118 of the computer assisted system 110 may adjust the lighting device 121 to emit a light with a different characteristic, based on a characteristic of the light received by the sensor 115 from the non-natural light source 131. For example, if the light received by the sensor 115 from the non-natural light source 131 is too bright or too high intensity, the controller 118 may adjust the lighting device 121 to emit a warning light to the non-natural light source 131. In addition, the controller 118 may adjust the lighting device 121 to emit a light with a different characteristic, based on a user's preference from the user 111, or the instruction or information 134 received by the receiver 114. In some embodiments, the controller 118 may adjust the lighting device 121 in one way, and adjust the lighting device 123 in a different way, depending on the location, the characteristics of the light emitted by the lighting device 121 and the lighting device 123, and other vehicles nearby. In embodiments, the computer assisted system 110 may automatically adjust the lighting device 121 to emit a light with increased light intensity when the surrounding of the vehicle becomes darker, which may be detected by the sensor 115.

Figure 3:
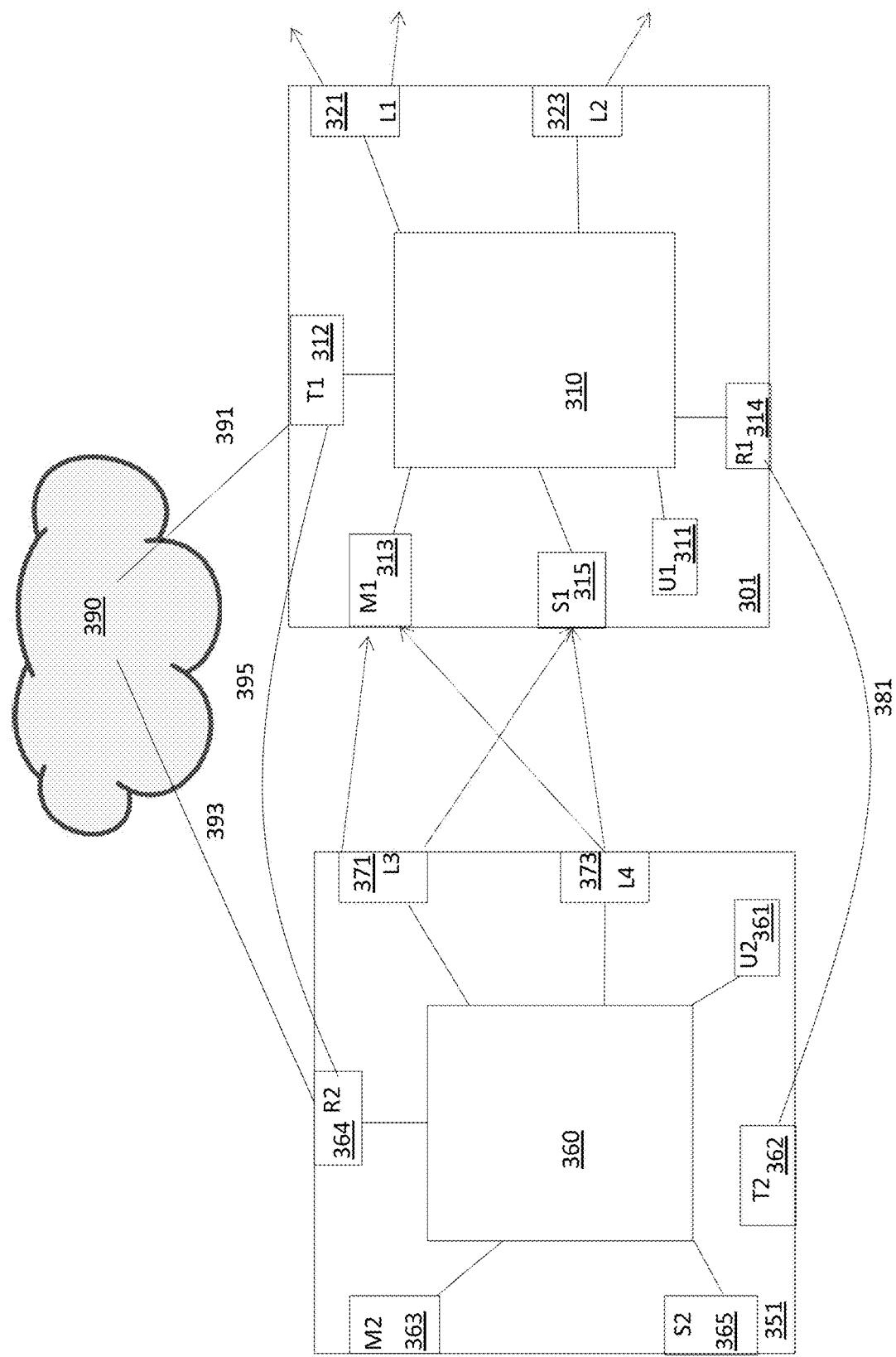
FIG. 3 illustrates an example computer assisted system of lighting control for a computer assisted vehicle that may adjust a lighting device of the vehicle to emit lights with different characteristics according to a light received from a lighting device of another vehicle, in accordance with various embodiments.

In addition, the controller 118 of the computer assisted system 110 may generate the instruction or information 132 based on the characteristic of the light emitted from the lighting device 121, the lighting device 123, the characteristic of the light received by the sensor 115 or the mirror 113, and/or an user input from the user 111. For example, when the non-natural light source 131 may be from a moving vehicle, the computer assisted system 110 may communicate with the moving vehicle to adjust the non-natural light source 131 on the moving vehicle to emit a light with a different characteristic, by transmitting the instruction or information 132 directly to the moving vehicle or through a cloud computing environment, as shown in FIG. 3.

Figure 2:
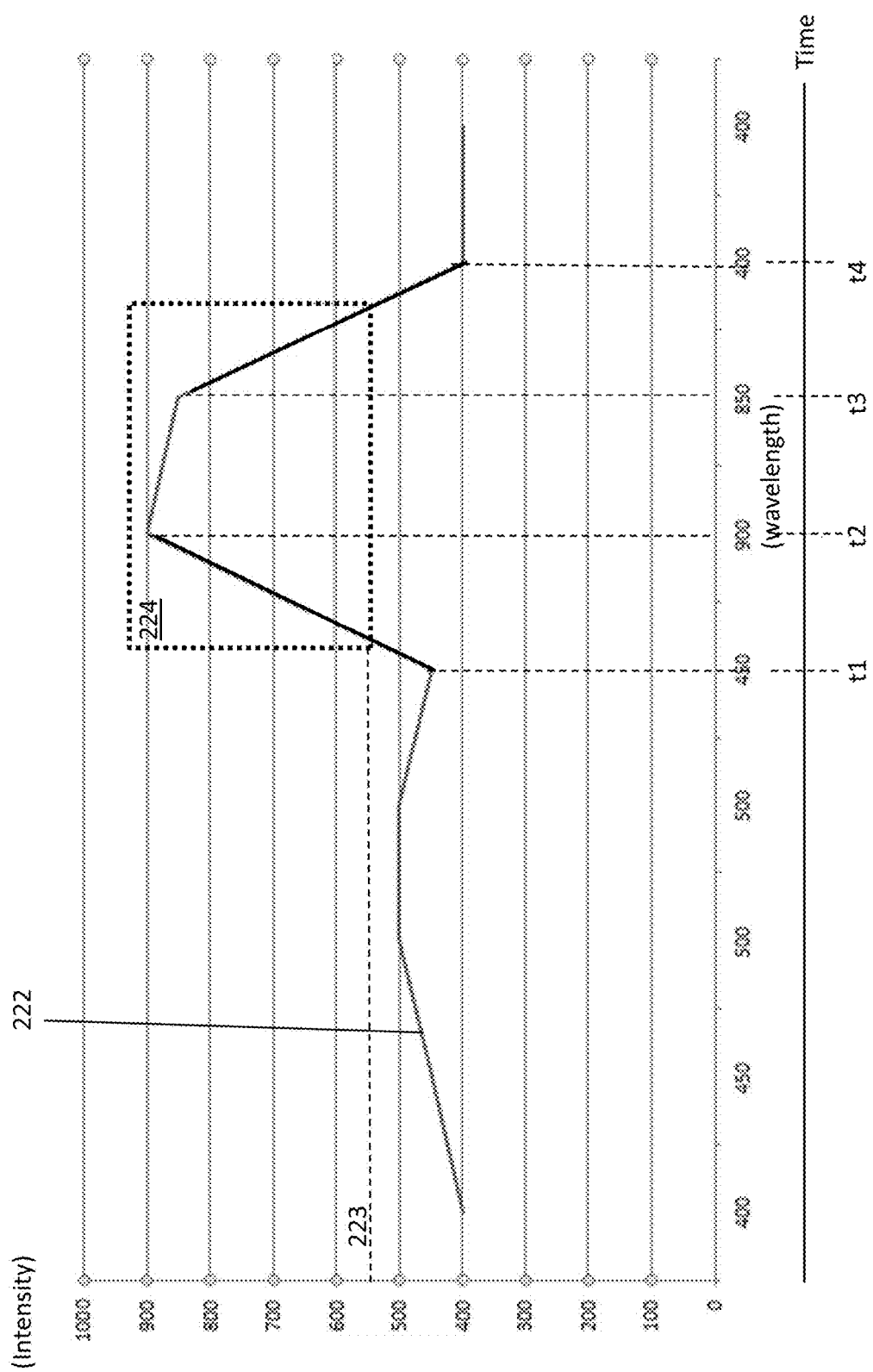
FIG. 2 illustrates an example correlation between a wavelength of a light and an intensity of the light for a computer assisted system of lighting control for a computer assisted vehicle, in accordance with various embodiments.

FIG. 2 illustrates an example correlation between a wavelength of a light and an intensity of the light for a computer assisted system of lighting control for a computer assisted vehicle, in accordance with various embodiments. For example, a curve 222 may represent the light wavelength detected over time by the sensor 115 for the lights received from the non-natural light source 131, the non-natural light source 135, and the non-natural light source 137. In embodiments, the sensor 115 may detect the individual wavelength from each light source, e.g., the non-natural light source 131, the non-natural light source 135, and the non-natural light source 137, and derive the overall wavelength received as the sum of the individual wavelength from each light source. At time $t_1$, $t_2$, $t_3$, and $t_4$, the sensor 115 may detect a wavelength $\ell_1$ for a light from the non-natural light source 131, a wavelength $\ell_2$ for a light from the non-natural light source 135, and a wavelength $\ell_3$ for a light from the non-natural light source 137, and derive a total wavelength of 450 nm, 900 nm, 850 nm, and 400 nm, which may correspond to a light intensity of 450 candela (cd), 900 cd, 850 cd, and 400 cd. The correspondence between a wavelength and a light intensity shown in the curve 222 may be based on a surrounding light intensity. The curve 222 may be an example only and may not be limiting. In some other embodiments, there may be a different correspondence between the wavelength detected and the light intensity based on the surrounding of the computer assisted vehicle 101.

In embodiments, the driver 111 may setup a light intensity threshold 223, which may be 550 cd as shown in FIG. 2. The light intensity threshold 223 may be determined based on one or more factors, such as the user/driver's preference, the vision of the user/driver, the road condition, the time of the day and the season. Furthermore, the light intensity threshold 223 may be changed from time to time, by different driver/user, for a same or a different trip.

If a wavelength detected by the sensor 115 is over the light intensity threshold 223, the computer assisted system 110 may generate the instruction or information 132 to be sent to the non-natural light source 131, the non-natural light source 135, or the non-natural light source 137 or their controllers to adjust the light emitted from some or all of them. For example, at time $t_2$ or $t_3$, the computer assisted system 110 may generate the instruction or information 132 to be sent to the non-natural light source 131, the non-natural light source 135, or the non-natural light source 137 to adjust the non-natural light sources to emit lights with different wavelengths.

In embodiments, when there may be multiple light sources, the computer assisted system 110 may select one or more light sources to change the characteristic of the light emitted from the one or more light sources. The computer assisted system 110 may make the selection based on various characteristics detected by the sensor. For example, the sensor 115 may detect a wavelength, an angle, a distance, or a height of a light emitted from each light source. Those characteristics of the lights, e.g., the angles of the lights, the distances of the light sources may be used by the computer assisted system 110 to identify the light sources that emit lights with certain wavelengths. For example, based on the individual wavelengths detected by the sensor 115, e.g., the wavelength $\ell_1$ for a light from the non-natural light source 131, the wavelength $\ell_2$ for a light from the non-natural light source 135, and the wavelength $\ell_3$ for a light from the non-natural light source 137, the computer assisted system 110 may determine to send an instruction to the light source with the highest wavelength, e.g., the non-natural light source 135, to reduce the wavelength. The instruction may be sent the by the transmitter 112 as shown in FIG. 1. In some other embodiments, the computer assisted system 110 may choose a light source to change a different characteristic of the light emitted from the light source. For example, if the sensor 115 detects a light from the non-natural light source 137 having a height right at a same level at the eye level of the driver, the sensor 115 may provide the information about the non-natural light source 137 to the computer assisted system 110. Based on the information, the computer assisted system 110 may generate an instruction to be sent to the non-natural light source 137 to change the angle of light.

In embodiments, at any moment within the area 224, the corresponding light intensity may be greater than the threshold 223, and the computer assisted system 110 may generate the instruction or information 132 to perform the same or similar tasks. In embodiments, the computer assisted system 110 may determine which light source to send an instruction to based on the various characteristics of the lights, e.g., the angles of the lights, the distances of the light sources, the height of the light sources, or the intensity of the lights. Furthermore, the computer assisted system 110 may generate the instruction or information 132, which may be sent directly to the non-natural light source 131, the non-natural light source 135, or the non-natural light source 137, or sent to a cloud computing environment, which may further control the non-natural light source 131, the non-natural light source 135, or the non-natural light source 137.

FIG. 3 illustrates an example computer assisted system 310 of lighting control for a computer assisted vehicle 301 that may adjust a lighting device, e.g., a lighting device 321 or a lighting device 323, of the vehicle to emit lights with different characteristics according to a light received from a lighting device, e.g., a lighting device 371 or a lighting device 373, of another vehicle, e.g., a computer assisted vehicle 351, in accordance with various embodiments. In embodiments, the computer assisted vehicle 301 or the computer assisted vehicle 351 may be examples of the computer assisted vehicle 101 in FIG. 1. In some embodiments, the computer assisted vehicle 351 may be another kind of vehicle without a computer assisted system of lighting control. When the computer assisted vehicle 351 includes a computer assisted system 360 of lighting control, the computer assisted system 360 may also adjust a lighting device, e.g., a lighting device 371 or a lighting device 373, to emit lights with different characteristics according to the light emitted from the lighting device 321 or the lighting device 323, or instructions received from the computer assisted vehicle 301.

In embodiments, the computer assisted vehicle 301 may include the computer assisted system 310. In addition, the computer assisted vehicle 301 may include the lighting device 321, the lighting device 323, a transmitter 312, a receiver 314, a sensor 315, and a mirror 313, which may be coupled to the computer assisted system 310, in addition to a user 311. The lighting device 321, the lighting device 323, the transmitter 312, the receiver 314, the sensor 315, the mirror 313, and the user 311, may be examples or similar to the lighting device 121, the lighting device 123, the transmitter 112, the receiver 114, the sensor 115, the mirror 113, and the user 111, respectively, and provide similar functions as described above for FIG. 1.

In embodiments, the computer assisted vehicle 351 may include the computer assisted system 360. In addition, the computer assisted vehicle 351 may include the lighting device 371, the lighting device 373, a transmitter 362, a receiver 364, a sensor 365, and a mirror 363, which may be coupled to the computer assisted system 360, in addition to a user 361. The lighting device 371, the lighting device 373, the transmitter 362, the receiver 364, the sensor 365, the mirror 363, and the user 365, may be examples or similar to the lighting device 121, the lighting device 123, the transmitter 112, the receiver 114, the sensor 115, the mirror 113, and the user 111, respectively, and provide similar functions as described above for FIG. 1.

In embodiments, the sensor 315 or the mirror 313 may be similar to the sensor 115 or the mirror 113 in FIG. 1, while the lighting device 371 and the lighting device 373 may be similar to the non-natural light source 131, the non-natural light source 135, or the non-natural light source 137 as shown in FIG. 1. For example, the sensor 315 may receive a light from the lighting device 371 and the lighting device 373. The transmitter 312 may transmit an instruction or information to the receiver 364, by a direct communication link 395 between the transmitter 312 and the receiver 364. In some other embodiments, the transmitter 312 may transmit an instruction or information by a link 391 between the transmitter 312 and a cloud computing environment 390, and followed by a link 393 between the cloud computing environment 390 and the receiver 364. Similarly, the transmitter 362 may transmit an instruction or information to the receiver 314, by a direct link 381 between the transmitter 362 and the receiver 314. In some embodiments, the transmitter 362 may transmit an instruction or information to the receiver 314 through links with the cloud computing environment 390, not shown.

In embodiments, the computer assisted system 310 may obtain a characteristic of the light received by the sensor 315 from the lighting device 371 or the lighting device 373, or process an instruction or information received by the receiver 314 from the transmitter 362 or from the cloud computing environment 390. Furthermore, the computer assisted system 310 may adaptively control the lighting device 321, the lighting device 323, or other lighting devices on the computer assisted vehicle 301, in a way similar to the way as above described for the computer assisted system 110.

In embodiments, the computer assisted system 360 may obtain a characteristic of the light received by the sensor 365, or process an instruction or information received by the receiver 364 from the transmitter 312 or from the cloud computing environment 390. Furthermore, the computer assisted system 360 may adaptively control the lighting device 371, the lighting device 373, or other lighting devices on the computer assisted vehicle 351, in a way similar to the way as above described for the computer assisted system 110. For example, when the lighting device 371 may emit a light with a too high intensity, which may be received by the sensor 315, the computer assisted system 310 may obtain a characteristic of the light received by the sensor 315, generate an instruction or information for the computer assisted system 360, and transmit the instruction or information to the computer assisted system 360 by the link 395. The computer assisted system 360 may receive the instruction or information generated by the computer assisted system 310, and adjust the lighting device 371 to emit a light with a lower intensity.

When the sensor 315 may receive lights from multiple light sources with different characteristics, the sensor 315 may detect each individual characteristic for each light source. For example, the sensor 315 may detect a wavelength of a light from the lighting device 371, and another wavelength of a light from another light source, not shown. The sensor 315 may provide such detected individual characteristics to the computer assisted system 310, and the computer assisted system 310 may determine to send an instruction to the light source with the highest wavelength, e.g., the lighting device 371, to reduce the wavelength. The instruction may be sent by the transmitter 312.

Figure 4:
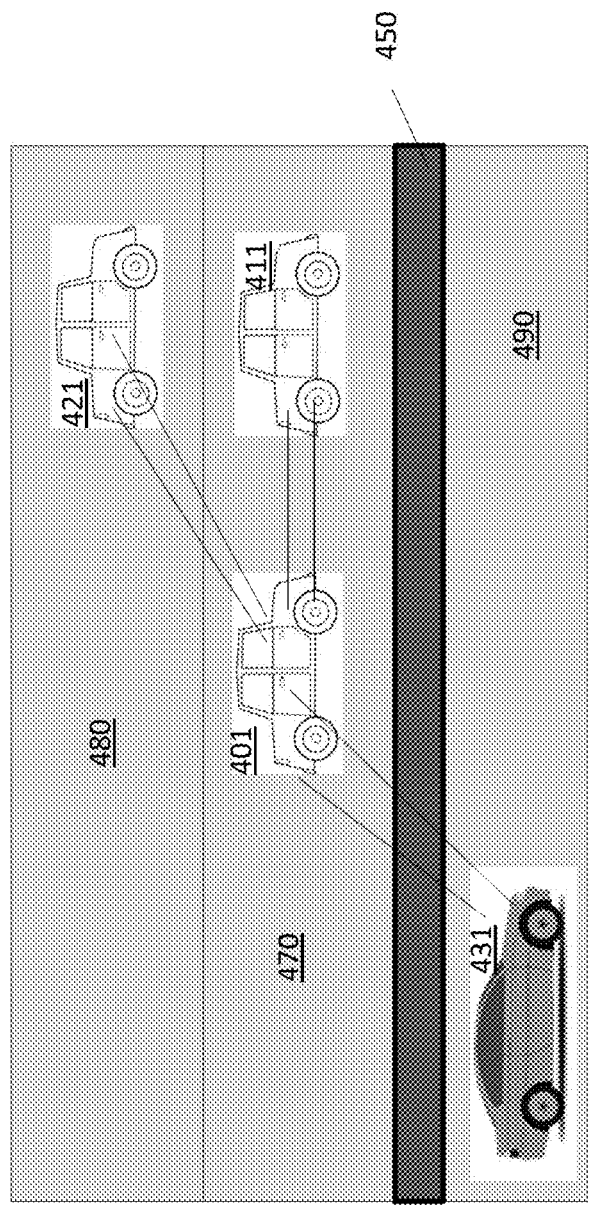
FIG. 4 illustrates an example computer assisted vehicle with a computer assisted system of lighting control that may adjust a lighting device of the vehicle to emit lights with different characteristics according to a light received from a lighting device of another vehicle in various locations, in accordance with various embodiments.

FIG. 4 illustrates an example computer assisted vehicle 401 with a computer assisted system of lighting control that may adjust a lighting device of the vehicle to emit lights with different characteristics according to a light received from a lighting device of another vehicle, e.g., a computer assisted vehicle 411, a computer assisted vehicle 421, or a computer assisted vehicle 431, in various locations, in accordance with various embodiments. In embodiments, the computer assisted vehicle 401, the computer assisted vehicle 411, the computer assisted vehicle 421, or the computer assisted vehicle 431 may be examples of the computer assisted vehicle 101 in FIG. 1, or the computer assisted vehicle 301 and the computer assisted vehicle 351 in FIG. 3. In some embodiments, some of the computer assisted vehicle 411, the computer assisted vehicle 421, or the computer assisted vehicle 431 may be a vehicle without a computer assisted system of lighting control. In embodiments, the relative position and the communication between any two computer assisted vehicles among the computer assisted vehicle 401, the computer assisted vehicle 411, the computer assisted vehicle 421, or the computer assisted vehicle 431 may be similar to the computer assisted vehicle 301 and the computer assisted vehicle 351 as shown in FIG. 3.

In embodiments, the computer assisted vehicle 401, the computer assisted vehicle 411, the computer assisted vehicle 421, or the computer assisted vehicle 431 may include a computer assisted system similar to the computer assisted system 110 in FIG. 1, or the computer assisted system 310 in FIG. 1. In addition, the computer assisted vehicle 401, the computer assisted vehicle 411, the computer assisted vehicle 421, or the computer assisted vehicle 431 may include at least a lighting device, a transmitter, a receiver, a sensor, and a mirror, which may be coupled to the computer assisted system. For example, not shown, the computer assisted vehicle 401, the computer assisted vehicle 411, the computer assisted vehicle 421, or the computer assisted vehicle 431 may include devices similar to the lighting device 121, the lighting device 123, the transmitter 112, the receiver 114, the sensor 115, the mirror 113, in addition to a user similar to the user 111, respectively, and may provide similar functions as described above for FIG. 1.

In embodiments, the computer assisted vehicle 401 may be on a lane 470. A lane, e.g., the lane 470, may also be referred to as a traffic lane. In addition, the computer assisted vehicle 411 may be behind the computer assisted vehicle 401 at the lane 470. Moreover, the computer assisted vehicle 421 may be at a lane 480 adjacent or next to the lane 470. Both the computer assisted vehicle 411 and the computer assisted vehicle 421 may be moving at a same direction as the computer assisted vehicle 401, and the computer assisted vehicle 421 may be next to the computer assisted vehicle 401 with a short distance, e.g., 1 meter or less. In some other embodiments, the distance between the computer assisted vehicle 401, the computer assisted vehicle 411, or the computer assisted vehicle 421, may be longer than 1 meter, and may depend on the technology used for the lighting devices, the sensor, the transmitter, and/or the receiver on the vehicles. On the other hand, the computer assisted vehicle 431 may be at a lane 490 separated from the lane 470 by a gap 450, and may be moving in an opposite direction as the computer assisted vehicle 401.

In embodiments, the computer assisted vehicle 401 may detect the positions of the computer assisted vehicle 411, the computer assisted vehicle 421, and the computer assisted vehicle 431 by various technologies. For example, the computer assisted vehicle 411 may report at regular frequency, e.g., every 10 seconds, the Global Positioning System (GPS) locations of the computer assisted vehicle 411 to the computer assisted vehicle 401. Additionally or alternatively, the computer assisted vehicle 401 may use sensors to detect the locations of the computer assisted vehicle 411. Furthermore, a cloud computing environment, not shown, may communicate to the computer assisted vehicle 401, the locations of the computer assisted vehicle 411, the computer assisted vehicle 421, and the computer assisted vehicle 431.

In addition, the sensors in the computer assisted vehicle 401 may detect various characteristics of the lights, e.g., the angles of the lights, the distances of the light sources, the wavelengths of the lights, received from the computer assisted vehicle 411, the computer assisted vehicle 421, and the computer assisted vehicle 431. Based on the location of the computer assisted vehicle 411, the computer assisted vehicle 421, and the computer assisted vehicle 431, and the various characteristics of the lights received by the sensors in the computer assisted vehicle 401, the computer assisted system in the computer assisted vehicle 401 may identify and match the lights received to the source of the lights.

Figure 5:
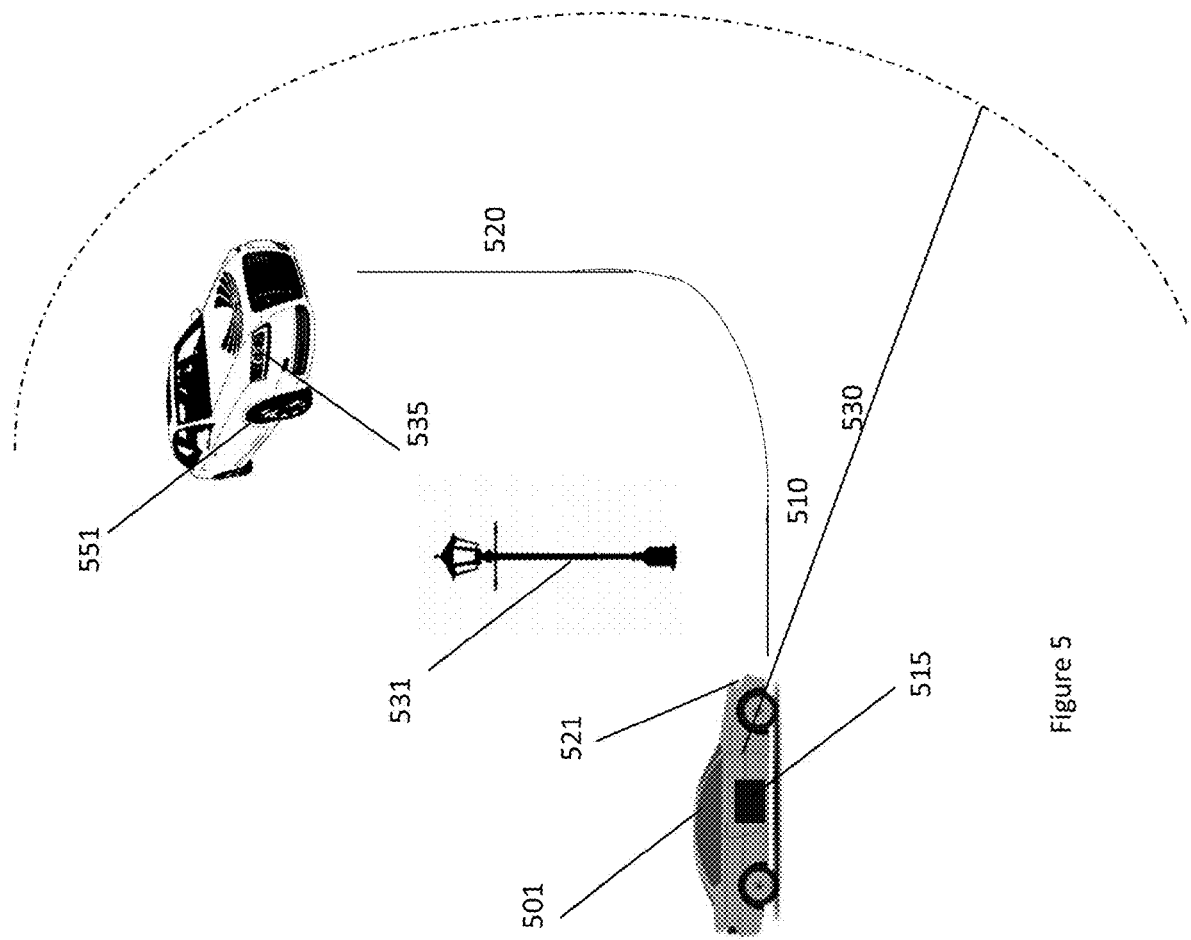
FIG. 5 illustrates another example computer assisted vehicle with a computer assisted system of lighting control that may adjust a lighting device of the vehicle to emit lights with different characteristics according to a light received from a stationary non-natural light source or from a lighting device of another vehicle, in accordance with various embodiments.

FIG. 5 illustrates another example computer assisted vehicle 501 with a computer assisted system of lighting control that may adjust a lighting device, e.g., a lighting device 521, of the vehicle to emit lights with different characteristics according to the light received from a stationary non-natural light source, e.g., a stationary non-natural light source 531, or from a lighting device of another vehicle, e.g., a computer assisted vehicle 551, in accordance with various embodiments. In embodiments, the computer assisted vehicle 501, and the computer assisted vehicle 551 may be examples of the computer assisted vehicle 101 in FIG. 1, the computer assisted vehicle 30, or the computer assisted vehicle 351 in FIG. 3. In some embodiments, the computer assisted vehicle 551 may be a vehicle without a computer assisted system of lighting control. In embodiments, the computer assisted vehicle 501, and the computer assisted vehicle 551 may communicate in a way similar to the way the computer assisted vehicle 301 and the computer assisted vehicle 351 communicate as shown in FIG. 3.

In embodiments, the computer assisted vehicle 501 and the computer assisted vehicle 551 may include a computer assisted system similar to the computer assisted system 110 in FIG. 1, or the computer assisted system 310 in FIG. 1. In addition, the computer assisted vehicle 501 or the computer assisted vehicle 551 may include one or more lighting devices, a transmitter, a receiver, a sensor, and a mirror, which may be coupled to the computer assisted system. For example, the computer assisted vehicle 501 may include the lighting device 521, and the computer assisted vehicle 551 may include a lighting device 535 that may be similar to the lighting device 121, or the lighting device 123. In addition, the computer assisted vehicle 501 or the computer assisted vehicle 551 may include a transmitter, a receiver, a sensor, e.g., a sensor 515, and a mirror, which may be similar to the transmitter 112, the receiver 114, the sensor 115, and the mirror 113, respectively, and may provide similar functions as described above for FIG. 1.

In embodiments, the computer assisted vehicle 501 may be on a lane 510. In addition, the computer assisted vehicle 551 may be on a lane 520 that may intersect perpendicularly with the lane 510. In some other embodiments, the lane 510 and the lane 520 may intersect at a different angle.

In embodiments, the sensor 515 on the computer assisted vehicle 501 may receive a light from the lighting device 535 of the computer assisted vehicle 551. In addition, the sensor 515 on the computer assisted vehicle 501 may receive a light from the stationary lighting device 531, which may be a street light, and may be located within a predefined radius 530 to the computer assisted vehicle 501. In some embodiments, the stationary lighting device 531 may be a smart street light that may communicate with the sensor 515 or the computer assisted vehicle 501. The sensor 515, the lighting device 535, and the stationary lighting device 531 may be similar to the sensor 115, the non-natural light source 135, and the non-natural light source 131, and may function similarly as described for the sensor 115, the non-natural light source 135, and the non-natural light source 131, as shown in FIG. 1.

In embodiments, the computer assisted vehicle 501 may detect the positions of the computer assisted vehicle 551, and the lighting device 531 by various technologies. For example, the computer assisted vehicle 551 may report at regular frequency, e.g., every 10 seconds, the Global Positioning System (GPS) locations of the computer assisted vehicle 551 to the computer assisted vehicle 501. Additionally or alternatively, the computer assisted vehicle 501 may use sensors to detect the locations of the computer assisted vehicle 551. Furthermore, a cloud computing environment, not shown, may communicate to the computer assisted vehicle 501, the locations of the computer assisted vehicle 551 and the lighting device 531.

In addition, the sensor 515 in the computer assisted vehicle 501 may detect various characteristics of the lights, e.g., the angles of the lights, the distances of the light sources, the wavelengths of the lights, received from the computer assisted vehicle 551 and the lighting device 531. Based on the location of the computer assisted vehicle 551 and the lighting device 531, and the various characteristics of the lights received by the sensors in the computer assisted vehicle 501, the computer assisted system in the computer assisted vehicle 501 may identify and match the lights received to the source of the lights.

Figure 6:
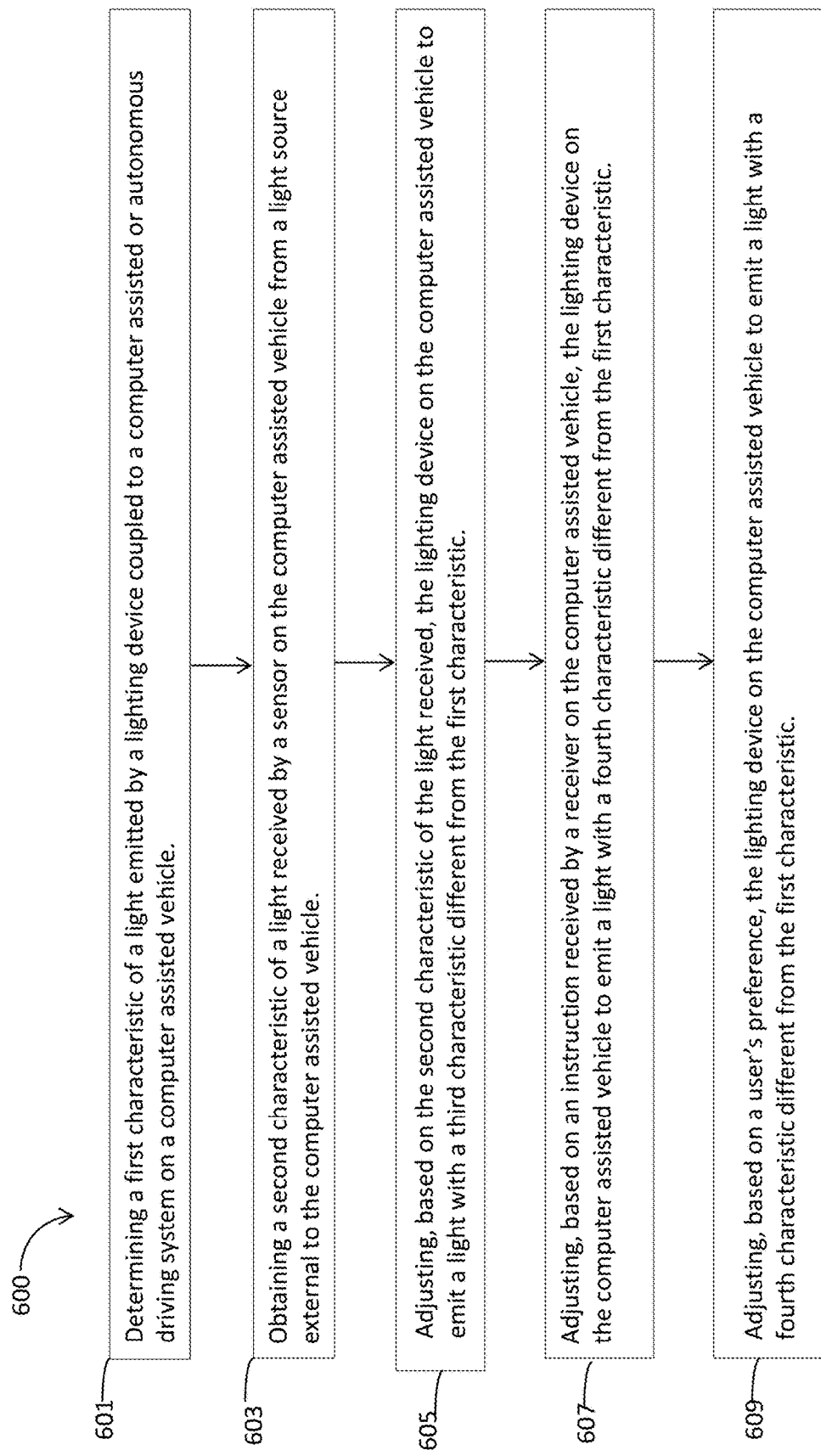
FIG. 6 illustrates an example process performed by a computer assisted system of lighting control for a computer assisted vehicle that may adjust a lighting device of the vehicle to emit lights with different characteristics, in accordance with various embodiments.

FIG. 6 illustrates an example process 600 performed by a computer assisted system of lighting control for a computer assisted vehicle that may adjust a lighting device of the vehicle to emit lights with different characteristics, in accordance with various embodiments. In embodiments, the process 600 may be a process performed by the computer assisted system 110 in FIG. 1, the computer assisted system 310, or the computer assisted system 360 in FIG. 3.

The process 600 may start at an interaction 601. During the interaction 601, the computer assisted system may determine a first characteristic of a light emitted by a lighting device coupled to a computer assisted or autonomous driving system on a computer assisted vehicle. For example, at the interaction 601, the computer assisted system 110 may determine a first characteristic of a light emitted by the lighting device 121 coupled to the computer assisted system 110 on the computer assisted vehicle 101.

During an interaction 603, the computer assisted system may obtain a second characteristic of a light received by a sensor on the computer assisted vehicle from a non-natural light source external to the computer assisted vehicle. For example, at the interaction 603, the computer assisted system 110 may obtain a second characteristic of a light received by the sensor 115 on the computer assisted vehicle 101 from the non-natural light source 131.

During an interaction 605, the computer assisted system may adjust, based on the second characteristic of the light received, the lighting device on the computer assisted vehicle to emit a light with a third characteristic different from the first characteristic. For example, at the interaction 605, the computer assisted system 110 may adjust, based on the second characteristic of the light received by the sensor 115, the lighting device 121 on the computer assisted vehicle 101 to emit a light with a third characteristic different from the first characteristic.

During an interaction 607, the computer assisted system may adjust, based on an instruction received by a receiver on the computer assisted vehicle, the lighting device on the computer assisted vehicle to emit a light with a fourth characteristic different from the first characteristic. For example, at the interaction 607, the computer assisted system 110 may adjust, based on the instruction 134 received by the receiver 114 on the computer assisted vehicle 101, the lighting device 121 on the computer assisted vehicle 101 to emit a light with a fourth characteristic different from the first characteristic.

During an interaction 609, the computer assisted system may adjust, based on a user's preference, the lighting device on the computer assisted vehicle to emit a light with a fourth characteristic different from the first characteristic. For example, at the interaction 609, the computer assisted system 110 may adjust, based on a user's preference from the user 111, the lighting device 121 on the computer assisted vehicle 101 to emit a light with a fourth characteristic different from the first characteristic.

Figure 7:
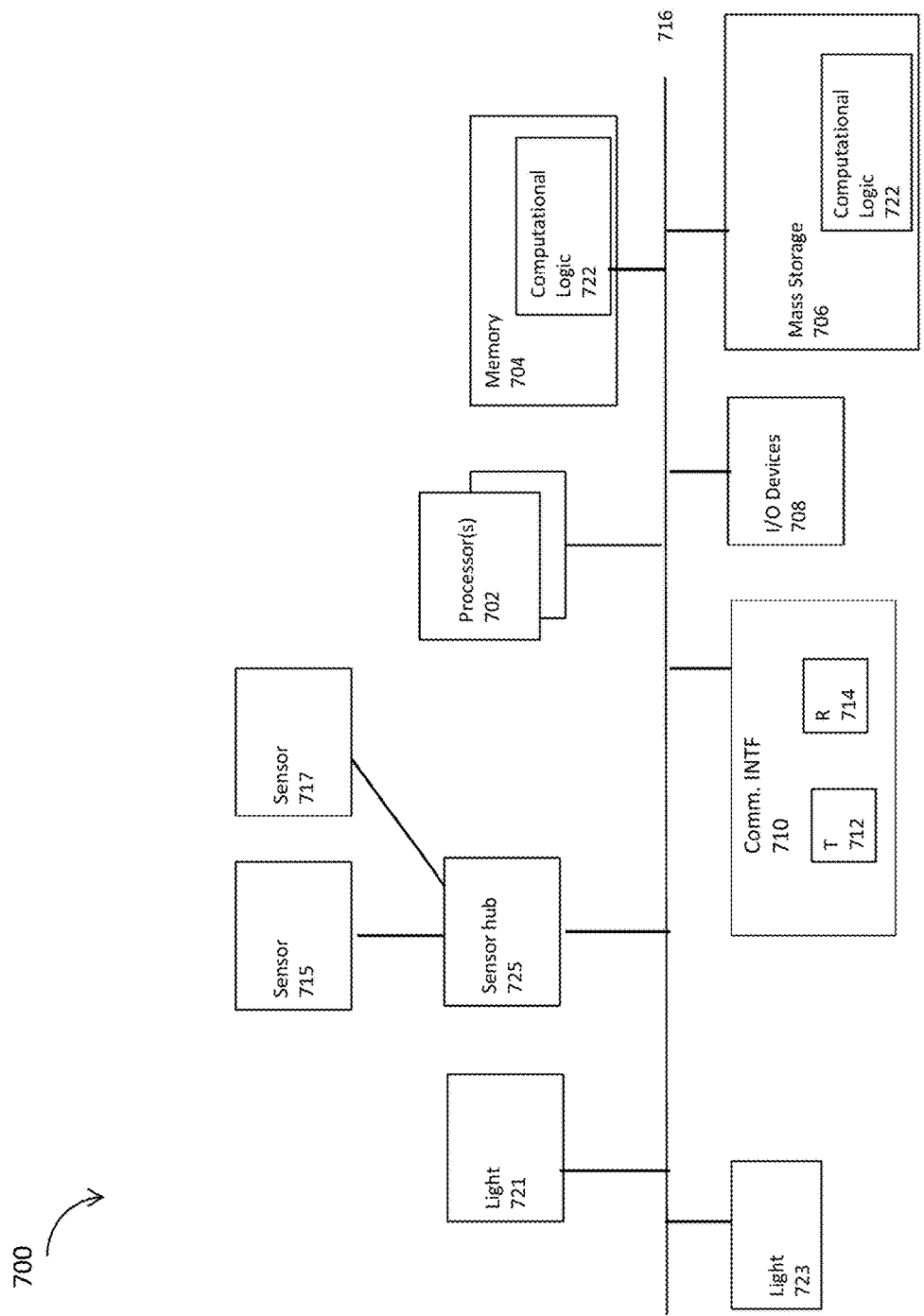
FIG. 7 illustrates an example system suitable for use to practice various aspects of the present disclosure, in accordance with various embodiments.

FIG. 7 illustrates an example system 700 suitable for use to practice various aspects of the present disclosure, in accordance with various embodiments. The system 700 may be an example of a portion of the computer assisted vehicle 101 in FIG. 1, the computer assisted vehicle 301, or the computer assisted vehicle 351 as shown in FIG. 3.

As shown, the system 700 may include one or more processors 702, each having one or more processor cores. In embodiments, the one or more processors 702 may perform one round of the computation and communication of a computer assisted system, e.g., the computer assisted system 110 in less than one second. Additionally, the system 700 may include a memory 704 and a mass storage 706, which may be any one of a number of known persistent storage medium. In embodiments, the memory 704 or the mass storage 706 may store data of the computer assisted vehicle 101 or its surroundings for a duration of one second or 100 msec. Furthermore, the system 700 may include a communication interface 710, which may include a transmitter 712 and a receiver 714.

The communication interface 710, the transmitter 712, and the receiver 714 may be any one of a number of known communication interfaces, transmitters, or receivers. In addition, the system 700 may include input/output devices 708, a lighting device 721, a lighting device 723, a sensor 715 and a sensor 717 coupled to a sensor hub 725. The elements may be coupled to each other via system bus 716, which may represent one or more buses. In the case of multiple buses, they may be bridged by one or more bus bridges (not shown).

In embodiments, the transmitter 712, the receiver 714, the lighting device 721, the lighting device 723, the sensor 715 or the sensor 717 may be similar to the transmitter 112, the receiver 114, the lighting device 121, the lighting device 123, and the sensor 115, respectively, and provide similar functions as described above for FIG. 1. In some embodiments, there may be multiple sensors, e.g., six sensors coupled to the sensor hub 725. Furthermore, the sensor 715 or the sensor 717 may read the light intensity or other characteristic of the received lights periodically, e.g., every 10 msec.

Each of these elements may perform its conventional functions known in the art. In particular, system memory 704 may be employed to store a working copy and a permanent copy of the programming instructions implementing the operations associated with providing a computer assisted system of lighting control for a computer assisted vehicle, as described in connection with FIGS. 1-6, and/or other functions, collectively referred to as computational logic 722 that provides the capability of the embodiments described in the current disclosure, e.g., the computer assisted system 110 of lighting control for a computer assisted vehicle. The various elements may be implemented by assembler instructions supported by processor(s) 702 or high-level languages, such as, for example, C, that can be compiled into such instructions.

The number, capability and/or capacity of these elements 702-725 may vary, depending on the number of other devices the system 700 is configured to support. Otherwise, the constitutions of elements 702-725 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system."

Figure 8:
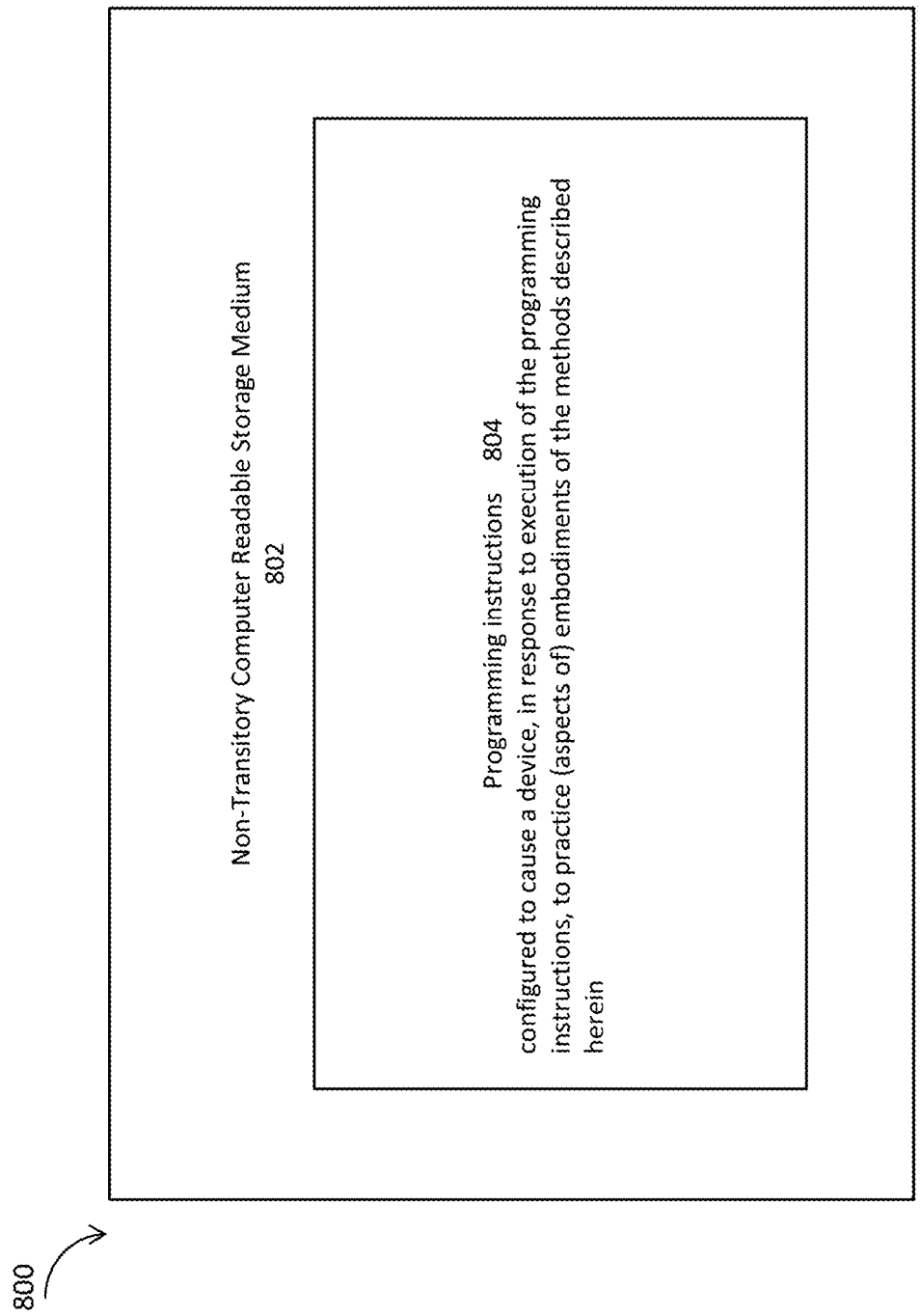
FIG. 8 illustrates a storage medium having instructions for practicing methods described with references to FIGS. 1-7, in accordance with various embodiments.

Furthermore, the present disclosure may take the form of a computer program product embodied in any tangible or non-transitory medium of expression having computer-usable program code embodied in the medium. FIG. 8 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 802 may include a number of programming instructions 804. Programming instructions 804 may be configured to enable a system, e.g., system 700, in response to execution of the programming instructions, to perform, e.g., various operations associated with the computer assisted system 110 of lighting control for the computer assisted vehicle 101, as shown in FIG. 1, the computer assisted system 310 of lighting control for the computer assisted vehicle 301, and the computer assisted system 360 of lighting control for the computer assisted vehicle 351, as shown in FIG. 3.

In alternate embodiments, programming instructions 804 may be disposed on multiple computer-readable non-transitory storage media 802 instead. In alternate embodiments, programming instructions 804 may be disposed on computer-readable transitory storage media 802, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalle, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include a computer assisted or autonomous driving vehicle, comprising: a lighting device on the vehicle to emit a light with a first characteristic; a sensor on the vehicle to receive a light from a non-natural light source external to the vehicle; and a computer assisted or autonomous driving system on the vehicle, coupled to the lighting device and the sensor to: obtain a second characteristic of the light received by the sensor from the non-natural light source external to the vehicle; and adjust, based on the second characteristic of the light received, the lighting device on the vehicle to emit a light with a third characteristic different from the first characteristic.

Example 2 may include the vehicle of example 1 and/or some other examples herein, wherein the computer assisted or autonomous driving system is to further: adjust, based on a user's preference, the lighting device on the vehicle to emit a light with a fourth characteristic different from the first characteristic.

Example 3 may include the vehicle of example 1 and/or some other examples herein, further comprising: a receiver on the vehicle to receive an instruction from a sender external to the vehicle to adjust the lighting device on the vehicle; and the computer assisted or autonomous driving system is to further: adjust, based on the received instruction, the lighting device on the vehicle to emit a light with a fourth characteristic different from the first characteristic.

Example 4 may include the vehicle of example 1 and/or some other examples herein, wherein the instruction is received from another vehicle, or from a cloud computing environment.

Example 5 may include the vehicle of example 1 and/or some other examples herein, wherein the computer assisted or autonomous driving system is to further: generate information based on the first characteristic of the light emitted from the lighting device and the second characteristic of the light received by the sensor; and the vehicle further includes: a transmitter on the vehicle to transmit the generated information to adjust the non-natural light source external to the vehicle.

Example 6 may include the vehicle of example 1 and/or some other examples herein, wherein the non-natural light source external to the vehicle includes a lighting device on a moving vehicle, or a stationary lighting device.

Example 7 may include the vehicle of example 6 and/or some other examples herein, wherein the computer assisted or autonomous driving system is to further: communicate with the moving vehicle to adjust the lighting device on the moving vehicle to emit a light with a fourth characteristic different from the second characteristic.

Example 8 may include the vehicle of example 6 and/or some other examples herein, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

Example 9 may include the vehicle of any one of examples 1-8 and/or some other examples herein, wherein the lighting device on the vehicle is a first lighting device on the vehicle, and the vehicle further includes a second lighting device on the vehicle; and the computer assisted or autonomous driving system is to further: adjust the second lighting device on the vehicle to emit a light with a fourth characteristic, wherein the second lighting device is adjusted differently from the first lighting device.

Example 10 may include the vehicle of any one of examples 1-8 and/or some other examples herein, wherein the first characteristic or the second characteristic includes a light intensity, a light wavelength, a light energy, a light distribution, a light angle, a light distance, a light area, or a duration for a light characteristic.

Example 11 may include the vehicle of any one of examples 1-8 and/or some other examples herein, wherein the lighting device on the vehicle includes a selected one of a headlamp, an auxiliary lamp, a front fog lamp, a cornering lamp, a spot light lamp, a daytime running lamp, a dim-dip lamp, a high intensity discharge lamp, a side marker light lamp, an emergency lamp, a reversing lamp, or an identification lamp.

Example 12 may include a computer assisted or autonomous driving vehicle, comprising: a lighting device on the vehicle to emit a light with a first characteristic; a receiver on the vehicle coupled to a computer assisted or autonomous driving system to receive an instruction from a sender external to the vehicle to adjust the lighting device on the vehicle; and the computer assisted or autonomous driving system on the vehicle, coupled to the lighting device and the receiver to: adjust, based on the received instruction, the lighting device on the vehicle to emit a light with a second characteristic different from the first characteristic.

Example 13 may include the vehicle of example 12 and/or some other examples herein, wherein the instruction is received from another vehicle, or from a cloud computing environment.

Example 14 may include the vehicle of example 12 and/or some other examples herein, wherein the lighting device on the vehicle is a first lighting device on the vehicle, and the vehicle further includes a second lighting device on the vehicle; and the computer assisted or autonomous driving system is to further: adjust the second lighting device on the vehicle to emit a light with a third characteristic, wherein the second lighting device is adjusted differently from the first lighting device.

Example 15 may include the vehicle of any one of examples 12-14 and/or some other examples herein, wherein the first characteristic of the light or the second characteristic of the light includes a light intensity, a light wavelength, a light energy, a light distribution, a light angle, a light distance, a light area, or a duration for a light characteristic.

Example 16 may include the vehicle of any one of examples 12-14 and/or some other examples herein, wherein the lighting device on the vehicle includes a selected one of a headlamp, an auxiliary lamp, a front fog lamp, a cornering lamp, a spot light lamp, a daytime running lamp, a dim-dip lamp, a side marker light lamp, a high intensity discharge lamp, an emergency lamp, a reversing lamp, or an identification lamp.

Example 17 may include the vehicle of any one of examples 12-14 and/or some other examples herein, further comprising: a sensor on the vehicle coupled to the computer assisted or autonomous driving system to receive a light from a non-natural light source external to the vehicle; and the computer assisted or autonomous driving system is to further: obtain a fourth characteristic of the light received by the sensor from the non-natural light source external to the vehicle; and adjust, based on the fourth characteristic of the light received, the lighting device on the vehicle to emit a light with a fifth characteristic different from the first characteristic.

Example 18 may include the vehicle of example 17 and/or some other examples herein, wherein the non-natural light source external to the vehicle includes a lighting device on a moving vehicle, or a stationary lighting device.

Example 19 may include the vehicle of example 18 and/or some other examples herein, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

Example 20 may include the vehicle of example 18 and/or some other examples herein, wherein the computer assisted or autonomous driving system is to further: communicate with the moving vehicle to make an adjustment to the lighting device on the moving vehicle to emit a light with a fifth characteristic different from the fourth characteristic.

Example 21 may include one or more non-transitory computer-readable media comprising instructions that cause a computer assisted or autonomous driving system in a vehicle, in response to execution of the instructions by the computer assisted or autonomous driving system, to: determine a first characteristic of a light emitted by a lighting device on the vehicle coupled to the computer assisted or autonomous driving system; obtain a second characteristic of a light received by a sensor on the vehicle from a non-natural light source external to the vehicle; and adjust, based on the second characteristic of the light received, the lighting device on the vehicle to emit a light with a third characteristic different from the first characteristic.

Example 22 may include the one or more non-transitory computer-readable media of example 21 and/or some other examples herein, wherein the computer assisted or autonomous driving system is further caused to: adjust, based on an instruction received by a receiver on the vehicle, the lighting device on the vehicle to emit a light with a fourth characteristic different from the first characteristic.

Example 23 may include the one or more non-transitory computer-readable media of example 21 and/or some other examples herein, wherein the computer assisted or autonomous driving system is further caused to: adjust, based on a user's preference, the lighting device on the vehicle to emit a light with a fourth characteristic different from the first characteristic.

Example 24 may include the one or more non-transitory computer-readable media of example 21 and/or some other examples herein, wherein the non-natural light source external to the vehicle includes a lighting device on a moving vehicle, or a stationary lighting device.

Example 25 may include the one or more non-transitory computer-readable media of example 24 and/or some other examples herein, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

Example 26 may include the one or more non-transitory computer-readable media of any one of examples 21-25 and/or some other examples herein, wherein the first characteristic or the second characteristic includes a light intensity, a light wavelength, a light energy, a light distribution, a light angle, a light distance, a light area, or a duration for a light characteristic.

Example 27 may include the one or more non-transitory computer-readable media of any one of examples 21-25 and/or some other examples herein, wherein the lighting device on the vehicle includes a selected one of a headlamp, an auxiliary lamp, a front fog lamp, a cornering lamp, a spot light lamp, a daytime running lamp, a dim-dip lamp, a high intensity discharge lamp, a side marker light lamp, an emergency lamp, a reversing lamp, or an identification lamp.

Example 28 may include a method for a computer assisted or autonomous driving system of lighting control for a vehicle, comprising: determining a first characteristic of a light emitted by a lighting device on the vehicle coupled to the computer assisted or autonomous driving system; obtaining a second characteristic of a light received by a sensor on the vehicle from a non-natural light source external to the vehicle; and adjusting, based on the second characteristic of the light received, the lighting device on the vehicle to emit a light with a third characteristic different from the first characteristic.

Example 29 may include the method of example 28 and/or some other examples herein, further comprising: adjusting, based on an instruction received by a receiver on the vehicle, the lighting device on the vehicle to emit a light with a fourth characteristic different from the first characteristic.

Example 30 may include the method of example 28 and/or some other examples herein, further comprising: adjusting, based on a user's preference, the lighting device on the vehicle to emit a light with a fourth characteristic different from the first characteristic.

Example 31 may include the method of example 28 and/or some other examples herein, wherein the lighting device on the vehicle is a first lighting device on the vehicle, and the vehicle further includes a second lighting device on the vehicle; and the method further comprises: adjusting the second lighting device on the vehicle to emit a light with a fourth characteristic, wherein the second lighting device is adjusted differently from the first lighting device.

Example 32 may include the method of example 28 and/or some other examples herein, further comprising: generating information based on the first characteristic of the light emitted from the lighting device and the second characteristic of the light received by the sensor; and transmitting the generated information to adjust the non-natural light source external to the vehicle.

Example 33 may include the method of example 28 and/or some other examples herein, wherein the non-natural light source external to the vehicle includes a lighting device on a moving vehicle, or a stationary lighting device.

Example 34 may include the method of example 33 and/or some other examples herein, further comprising: communicating with the moving vehicle to adjust the lighting device on the moving vehicle to emit a light with a fourth characteristic different from the second characteristic.

Example 35 may include the method of example 33 and/or some other examples herein, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

Example 36 may include the method of any one of examples 28-35 and/or some other examples herein, wherein the first characteristic or the second characteristic includes a light intensity, a light wavelength, a light energy, a light distribution, a light angle, a light distance, a light area, or a duration for a light characteristic.

Example 37 may include the method of any one of examples 28-35 and/or some other examples herein, wherein the lighting device on the vehicle includes a selected one of a headlamp, an auxiliary lamp, a front fog lamp, a cornering lamp, a spot light lamp, a daytime running lamp, a dim-dip lamp, a high intensity discharge lamp, a side marker light lamp, an emergency lamp, a reversing lamp, or an identification lamp.

Example 38 may include one or more non-transitory computer-readable media comprising instructions that cause a computer assisted or autonomous driving system in a vehicle, in response to execution of the instructions by the computer assisted or autonomous driving system, to perform the method of any one of examples 28-37.

Example 39 may include an apparatus for a computer assisted or autonomous driving system of lighting control for a vehicle, comprising: means for determining a first characteristic of a light emitted by a lighting device on the vehicle coupled to the computer assisted or autonomous driving system; means for obtaining a second characteristic of a light received by a sensor on the vehicle from a non-natural light source external to the vehicle; and means for adjusting, based on the second characteristic of the light received, the lighting device on the vehicle to emit a light with a third characteristic different from the first characteristic.

Example 40 may include the apparatus of example 39 and/or some other examples herein, further comprising: means for adjusting, based on an instruction received by a receiver on the vehicle, the lighting device on the vehicle to emit a light with a fourth characteristic different from the first characteristic.

Example 41 may include the apparatus of example 39 and/or some other examples herein, further comprising: means for adjusting, based on a user's preference, the lighting device on the vehicle to emit a light with a fourth characteristic different from the first characteristic.

Example 42 may include the apparatus of example 39 and/or some other examples herein, wherein the lighting device on the vehicle is a first lighting device on the vehicle, and the vehicle further includes a second lighting device on the vehicle; and the apparatus further comprises: means for adjusting the second lighting device on the vehicle to emit a light with a fourth characteristic, wherein the second lighting device is adjusted differently from the first lighting device.

Example 43 may include the apparatus of example 39 and/or some other examples herein, further comprising: means for generating information based on the first characteristic of the light emitted from the lighting device and the second characteristic of the light received by the sensor; and means for transmitting the generated information to adjust the non-natural light source external to the vehicle.

Example 44 may include the apparatus of example 39 and/or some other examples herein, wherein the non-natural light source external to the vehicle includes a lighting device on a moving vehicle, or a stationary lighting device.

Example 45 may include the apparatus of example 44 and/or some other examples herein, further comprising: means for communicating with the moving vehicle to adjust the lighting device on the moving vehicle to emit a light with a fourth characteristic different from the second characteristic.

Example 46 may include the apparatus of example 44 and/or some other examples herein, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

Example 47 may include the apparatus of any of examples 39-44 and/or some other examples herein, wherein the first characteristic or the second characteristic includes a light intensity, a light wavelength, a light energy, a light distribution, a light angle, a light distance, a light area, or a duration for a light characteristic.

Example 48 may include the apparatus of any of examples 39-44 and/or some other examples herein, wherein the lighting device on the vehicle includes a selected one of a headlamp, an auxiliary lamp, a front fog lamp, a cornering lamp, a spot light lamp, a daytime running lamp, a dim-dip lamp, a high intensity discharge lamp, a side marker light lamp, an emergency lamp, a reversing lamp, or an identification lamp.

Example 49 may include an apparatus for on-board computer assisted or autonomous driving of vehicles, comprising: one or more processors disposed on a vehicle; and a computer assisted or autonomous driving system on the vehicle to be operated by the one or more processors to: determine a first characteristic of a light emitted by a lighting device on the vehicle coupled to the computer assisted or autonomous driving system; obtain a second characteristic of a light received by a sensor on the vehicle from a non-natural light source external to the vehicle; and adjust, based on the second characteristic of the light received, the lighting device on the vehicle to emit a light with a third characteristic different from the first characteristic.

Example 50 may include the apparatus of example 49 and/or some other examples herein, wherein the computer assisted or autonomous driving system on the vehicle to be operated by the one or more processors is further to: adjust, based on an instruction received by a receiver on the vehicle, the lighting device on the vehicle to emit a light with a fourth characteristic different from the first characteristic.

Example 51 may include the apparatus of example 49 and/or some other examples herein, wherein the computer assisted or autonomous driving system on the vehicle to be operated by the one or more processors is further to: adjust, based on a user's preference, the lighting device on the vehicle to emit a light with a fourth characteristic different from the first characteristic.

Example 52 may include the apparatus of example 49 and/or some other examples herein, wherein the lighting device on the vehicle is a first lighting device on the vehicle, and the vehicle further includes a second lighting device on the vehicle; and the computer assisted or autonomous driving system on the vehicle to be operated by the one or more processors is further to: adjust the second lighting device on the vehicle to emit a light with a fourth characteristic, wherein the second lighting device is adjusted differently from the first lighting device.

Example 53 may include the apparatus of example 49 and/or some other examples herein, wherein the computer assisted or autonomous driving system on the vehicle to be operated by the one or more processors is further to: generate information based on the first characteristic of the light emitted from the lighting device and the second characteristic of the light received by the sensor; and transmit the generated information to adjust the non-natural light source external to the vehicle.

Example 54 may include the apparatus of example 49 and/or some other examples herein, wherein the non-natural light source external to the vehicle includes a lighting device on a moving vehicle, or a stationary lighting device.

Example 55 may include the apparatus of example 54 and/or some other examples herein, wherein the computer assisted or autonomous driving system on the vehicle to be operated by the one or more processors is further to: communicate with the moving vehicle to adjust the lighting device on the moving vehicle to emit a light with a fourth characteristic different from the second characteristic.

Example 56 may include the apparatus of example 54 and/or some other examples herein, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

Example 57 may include the apparatus of any one of examples 49-54 and/or some other examples herein, wherein the first characteristic or the second characteristic includes a light intensity, a light wavelength, a light energy, a light distribution, a light angle, a light distance, a light area, or a duration for a light characteristic.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A computer assisted or autonomous driving vehicle, comprising:
   a lighting device on the vehicle to emit a light away from the vehicle with first one or more characteristics;
   a sensor on the vehicle to sense a light from a non-natural light source external to the vehicle; and
   a computer assisted or autonomous driving system on the vehicle, coupled to the lighting device and the sensor to:
   determine second one or more characteristics of the light sensed by the sensor from the non-natural light source external to the vehicle;
   adjust, based on the second one or more characteristics of the light sensed, the lighting device on the vehicle to emit the light away from the vehicle with third one or more characteristics where the first and third one or more characteristics differ in at least one characteristic; and generate information based on the first one or more characteristics of the light emitted from the lighting device and the second one or more characteristics of the light received by the sensor; and a transmitter on the vehicle to transmit the generated information to adjust the non-natural light source external to the vehicle.

2. The vehicle of claim 1, wherein the computer assisted or autonomous driving system is to further:

adjust, based on a user's preference, the lighting device on the vehicle to emit a light with fourth one or more characteristics, wherein the first and fourth one or more characteristics differ in at least one characteristic.

3. A computer assisted or autonomous driving vehicle, comprising:

a lighting device on the vehicle to emit a light with a first characteristic;

a sensor on the vehicle to receive a light from a non-natural light source external to the vehicle; and a computer assisted or autonomous driving system on the vehicle, coupled to the lighting device and the sensor to:

obtain a second characteristic of the light received by the sensor from the non-natural light source external to the vehicle; and adjust, based on the second characteristic of the light received, the lighting device on the vehicle to emit a light with a third characteristic different from the first characteristic;

wherein the vehicle further comprises a receiver on the vehicle to receive an instruction from another vehicle, or from a cloud computing environment external to the vehicle to adjust the lighting device on the vehicle; and wherein the computer assisted or autonomous driving system is to further:

adjust, based on the received instruction, the lighting device on the vehicle to emit a light with a fourth characteristic different from the first characteristic.

4. The vehicle of claim 1, wherein the non-natural light source external to the vehicle includes a lighting device on a moving vehicle, or a stationary lighting device.

5. The vehicle of claim 4, wherein the computer assisted or autonomous driving system is to further:

communicate with the moving vehicle to adjust the lighting device on the moving vehicle to emit a light with fourth one or more characteristics where the second and the fourth one or more characteristics differ in at least one characteristic.

6. The vehicle of claim 4, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

7. The vehicle of claim 1, wherein the lighting device on the vehicle is a first lighting device on the vehicle, and the vehicle further includes a second lighting device on the vehicle; and the computer assisted or autonomous driving system is to further:

adjust the second lighting device on the vehicle to emit a light with fourth one or more characteristics, wherein the second lighting device is adjusted differently from the first lighting device.

8. The vehicle of claim 1, wherein the first one or more characteristics includes at least one of a light intensity, a light wavelength, a light energy, a light distribution, a light angle, a light distance, a light area, or a duration for a light characteristic.

9. The vehicle of claim 3, wherein the lighting device on the vehicle includes a selected one of an auxiliary lamp, a front fog lamp, a cornering lamp, a spot light lamp, a daytime running lamp, a dim-dip lamp, a side marker light lamp, an emergency lamp, a reversing lamp, or an identification lamp.

10. An apparatus for on-board computer assisted or autonomous driving of vehicles, comprising:

one or more processors disposed on a vehicle; and a computer assisted or autonomous driving system on the vehicle to be operated by the one or more processors to:

determine a first characteristic of a light emitted away from the vehicle by a lighting device on the vehicle coupled to the computer assisted or autonomous driving system;

obtain a second characteristic of a light received by a sensor on the vehicle from a non-natural light source external to the vehicle; and adjust, based on the second characteristic of the light received, the lighting device on the vehicle to emit a light with a third characteristic different from the first characteristic;

wherein the computer assisted or autonomous driving system on the vehicle to be operated by the one or more processors is further to:

generate information based on the first characteristic of the light emitted from the lighting device and the second characteristic of the light received by the sensor; and transmit the generated information to adjust the non-natural light source external to the vehicle.

11. The apparatus of claim 10, wherein the computer assisted or autonomous driving system on the vehicle to be operated by the one or more processors is further to:

adjust, based on an instruction received by a receiver on the vehicle, the lighting device on the vehicle to emit a light with a fourth characteristic different from the first characteristic.

12. The apparatus of claim 10, wherein the computer assisted or autonomous driving system on the vehicle to be operated by the one or more processors is further to:

adjust, based on a user's preference, the lighting device on the vehicle to emit a light with a fourth characteristic different from the first characteristic.

13. The apparatus of claim 10, wherein the lighting device on the vehicle is a first lighting device on the vehicle, and the vehicle further includes a second lighting device on the vehicle; and the computer assisted or autonomous driving system on the vehicle to be operated by the one or more processors is further to:

adjust the second lighting device on the vehicle to emit a light with a fourth characteristic, wherein the second lighting device is adjusted differently from the first lighting device.

14. The apparatus of claim 10, wherein the non-natural light source external to the vehicle includes a lighting device on a moving vehicle, or a stationary lighting device.

15. The apparatus of claim 14, wherein the computer assisted or autonomous driving system on the vehicle to be operated by the one or more processors is further to:

communicate with the moving vehicle to adjust the lighting device on the moving vehicle to emit a light with a fourth characteristic different from the second characteristic.

16. The apparatus of claim 14, wherein the moving vehicle is in a location selected from a location behind the vehicle in a same traffic lane, a location next to the vehicle in an adjacent traffic lane, a location in an opposite traffic lane to the vehicle, or a location within a predefined radius to the vehicle.

17. The apparatus of claim 10, wherein the first characteristic or the second characteristic includes a light intensity, a light wavelength, a light energy, a light distribution, a light angle, a light distance, a light area, or a duration for a light characteristic.

18. A method for a computer assisted or autonomous driving system of a vehicle to control lighting, comprising:
obtaining a first characteristic of a light emitted away from the vehicle by a lighting device on the vehicle coupled to the computer assisted or autonomous driving system, the vehicle being a first vehicle, the lighting device being a first lighting device, and the light being a first light;
determining a second characteristic of a second light received by a sensor on the first vehicle from a second vehicle moving proximally external to the first vehicle; and
communicating with the second vehicle to adjust a second lighting device on the second vehicle to emit the second light with a third characteristic different from the second characteristic.

19. The method of claim 18, further comprising:
adjusting, based on an instruction received by a receiver on the first vehicle, the first lighting device on the first vehicle to emit the first light with a fourth characteristic different from the first characteristic; or
adjusting, based on the second characteristic of the second light received, the first lighting device on the first vehicle to emit the first light with a fourth characteristic different from the first characteristic.

20. The method of claim 18, further comprising:
adjusting, based on a user's preference, the first lighting device on the first vehicle to emit the first light with a fourth characteristic different from the first characteristic.

21. The method of claim 18, wherein the first vehicle further includes a third lighting device; and the method further comprises:
adjusting the third lighting device on the first vehicle to emit a third light with a fourth characteristic, wherein the third lighting device is adjusted differently from the first lighting device.

22. One or more non-transitory computer-readable media comprising instructions that cause a computer assisted or autonomous driving system in a vehicle, in response to execution of the instructions by the computer assisted or autonomous driving system, to perform the method of claim 18.

* * * * *